United States Patent [19]
Jung et al.

[11] 4,289,997
[45] Sep. 15, 1981

[54] DRIVE APPARATUS HAVING AT LEAST TWO ELECTRIC MOTORS

[75] Inventors: Bernhard Jung, Winnweiler; Michael Teichmann, Obermoschel, both of Fed. Rep. of Germany

[73] Assignee: Keiper Automobiltechnik GmbH & Co. KG, Remscheid, Fed. Rep. of Germany

[21] Appl. No.: 51,130

[22] Filed: Jun. 22, 1979

[30] Foreign Application Priority Data

Jun. 22, 1978 [DE] Fed. Rep. of Germany ....... 2827340

[51] Int. Cl.³ .............................................. H02P 1/54
[52] U.S. Cl. .................................... 318/113; 318/49; 318/50; 318/51
[58] Field of Search .................. 318/49, 50, 102, 103, 318/112, 113, 51, 53, 82, 84, 111; 307/12, 30, 41, 38, 36, 37

[56] References Cited
U.S. PATENT DOCUMENTS

3,426,259 2/1969 Ziehm ................................ 318/102
3,792,332 2/1974 Fuller .............................. 318/103 X
4,023,081 5/1977 Murray et al. .................. 318/112 X
4,128,797 12/1978 Murata ............................ 318/103 X

FOREIGN PATENT DOCUMENTS

2724759 12/1977 Fed. Rep. of Germany .
2150262 12/1977 Fed. Rep. of Germany .

OTHER PUBLICATIONS

Hansa Ship Building Harbor, vol. 97, p. 437, Aug–Sep. 1960.

*Primary Examiner*—Ulysses Weldon
*Attorney, Agent, or Firm*—Wigman & Cohen

[57] ABSTRACT

A drive apparatus has at least two electric motors. There is also a central control common to all motors which lie in series in a closed-circuit energy supply. Each motor has an individual control unit which can be turned on and off from the central control via a control line by an address. Each motor also contains a short-circuit device lying in parallel with its connecting terminals.

10 Claims, 5 Drawing Figures

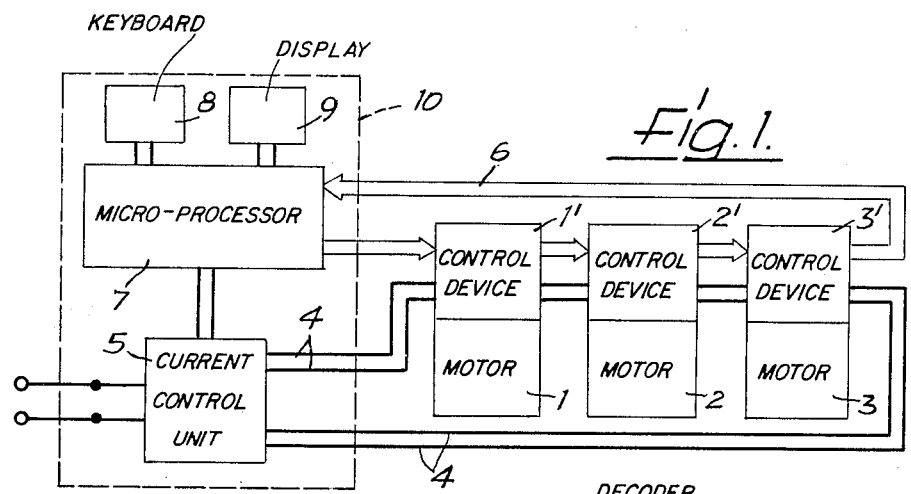
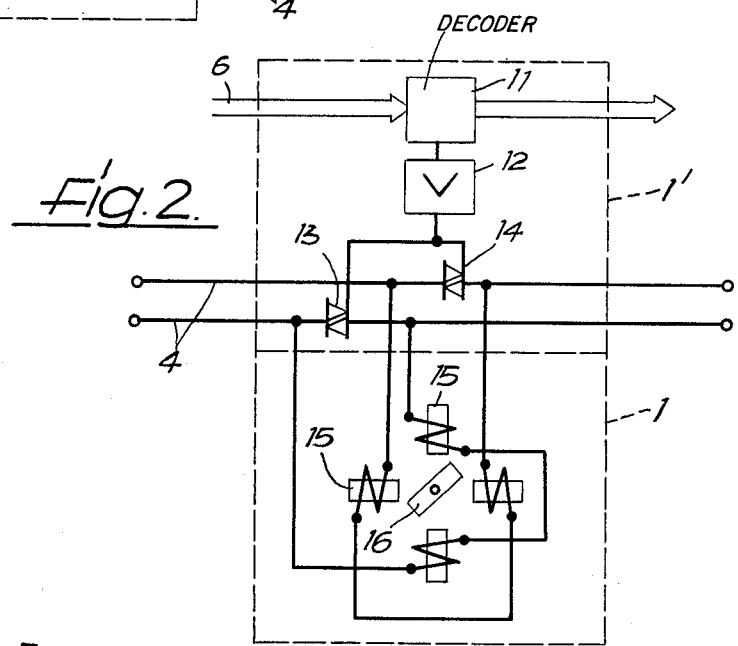
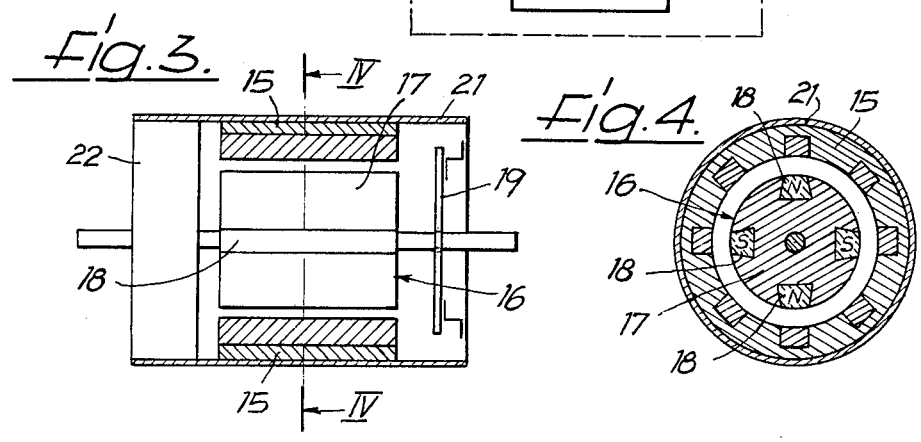
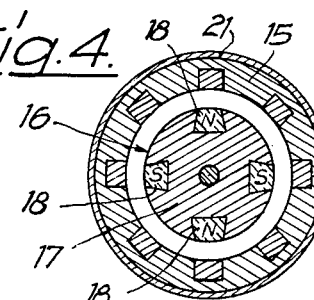

DRIVE APPARATUS HAVING AT LEAST TWO ELECTRIC MOTORS

BACKGROUND OF THE INVENTION

1. Field of the Invention

The invention relates to a drive apparatus having at least two electric motors as well as a central control common to all motors. The motors can be turned on and off from the central control.

2. Description of the Prior Art

In a known drive apparatus of this type, a multiple lead energy supply line leads to each of the motors from the central control in which the switches for all motors are collected. The expense for the wiring is, therefore, relatively large. This is especially true when the cable channels are narrow and poorly accessible, such as is the case in a motorized vehicle which requires a large number of electric motors, for example, for an adjustment of the seats.

The basic purpose of the invention is to create a drive apparatus of the above-mentioned type, which results in a low expense for the wiring even with a relatively large number of motors. This objective is achieved by the drive apparatus of the present invention.

Because all motors lie in series in a closed-circuit energy supply, only this single closed-circuit is necessary for the energy supply of all motors. This closed-circuit need have only one or two leads depending upon the type of motor used. It is true that an additional control line is necessary for the energy supply of the control device of each motor and the transmission of the control impulses. This control line can have the same course as the closed-circuit energy supply, so that this control line does not noticeably increase the expense for the wiring.

Depending upon whether it is necessary to keep two or more motors in operation at the same time, or whether it is sufficient to turn on various motors in succession, as necessary, and keep only a single motor in operation at one time, the energy supply will be different. In the latter case, it is sufficient to connect the selected motor with the current source in that its short-circuit device is opened. Such an instance will be present, for example, as a rule in a motor vehicle, when the motors of the drive apparatus serve to adjust the seats or other portions of the motor vehicle, such as the side windows and a sunroof, because all of these functions can be performed in succession, even if they are in one functional connection, such as can be the case in a seat adjustment. If several motors must run simultaneously, either a current limit can be provided for simultaneous operation with less than the maximum number of motors or, in a drive of more than one motor, a corresponding voltage increase can be provided. Here it is a prerequisite, however, that all motors can be fed simultaneously with the same direction of current. An impulse drive, in which the individual motors in the multiplex process are supplied with impulses in the case of simultaneous operation of several motors, would be free of this disadvantage. However, then at each impulse, the short-circuit device of the motor which received the last impulse and the short-circuit device of the motor which is to receive the next impulse would also have to be switched.

SUMMARY OF THE INVENTION

In a preferred exemplary embodiment, at least a portion of the motors are formed as step motors. The advantage of such step motors is that the step frequency and thus the revolutions per minute can be determined from the central control and no position report from the motor is necessary for this purpose. In addition, only the number of steps need to be ascertained while taking into consideration the direction of these steps for a position determination of the motor or of the object driven thereby. However, a step motor usually requires a double-lead energy supply line.

A particular simple, sturdy, and, therefore, inexpensive and maintenance-free motor, which still performs a very defined rotational angle at each step and reliably runs in the desired direction, is obtained when the stator has two winding groups in line with a first or a second lead of the closed-circuit and has at least four poles, whereby a winding of one or the other winding groups is associated alternately with the circumferentially successive poles and the windingless rotor has a number of permanent magnet-activated poles corresponding to the number of pole pairs of the stator. For a step, the current direction and one winding group only need to be reversed, whereby the selection of this winding group determines the direction of rotation, because in this type of a change of the direction of the current in one winding group, the rotor will rotate out of its position in which its poles lie between two respective poles of the stator in one or the other rotational direction by one pole separation.

A single lead closed-circuit energy supply is sufficient when the motors have a direct current winding in the stator and a windingless rotor, which has a number of permanent magnet-activated pole pairs corresponding to the number of pole pairs of a stator. In this type of motor, the control device must include a signal transmitter which transmits a position characterization and commutating signal over a control line common to all motors after every rotation of the rotor by one pole separation. On the basis of this signal, the central control can reverse the direction of current in the closed-circuit with the aid of a pole reversing device. If the central control begins the current reversal and dependence on the incoming position characterization and commutating signals, then the motor does not run with a precisely predetermined frequency, as would be the case if the central control would transmit the pole reversal frequency, but rather with a rpm which adjusts to the load, i.e., like a direct current motor.

In a preferred exemplary embodiment, the central control includes a micro-processor which can establish the direction of current necessary for the turn-on current while taking into consideration the direction of rotation required for the selected motor, and, in a step motor of the above-mentioned type, can also establish the winding group in which the direction of current is to be changed. This type of micro-processor, an example of which is an Intel 8048, is also advantageous to the extent that it can ascertain and store the position of the apparatus driven by the motor, i.e., for example, the adjustment of a motor vehicle seat on the basis of the performed steps or current reversals or on the basis of position characterization and commutating signals of the associated motor, so that the last position achieved can be interrogated at any time.

If it must be taken into account that the energy supply of the control center may fail, then the necessary data storage would be in need of a memory which is not cleared by a failure of the energy supply. In many cases, this will be more inexpensive. At one end of the adjustment range of the apparatus driven by the motor, a rigid stop can be provided. Then, and with the aid of a microprocessor, automatically the apparatus can be moved to the rigid stop and from there into the desired new position. To assure that the address impulses only activate the selected control device, a decoder can be associated with each control device, which may be a Billig decoder in the form of an impulse counter. This decoder can control the short-circuit device by means of an amplifying stage. The short-circuit device preferably consists of a triode ac semi-conductor switch in each energy supply lead, but can also be formed by a relay or respective double thyristors.

BRIEF DESCRIPTION OF THE DRAWINGS

The invention is described in greater detail below with the aid of exemplary embodiments illustrated in the drawings. Shown are:

FIG. 1—a block circuit diagram of a first exemplary embodiment;

FIG. 2—a schematically illustrated circuit of one of the motors with the associated electronics of the first exemplary embodiment;

FIG. 3—a schematically illustrated longitudinal section of the motor according to FIG. 2;

FIG. 4—a cross section through a motor of the first exemplary embodiment;

DETAILED DESCRIPTION OF THE PREFERRED EMBODIMENTS

Figure 5:
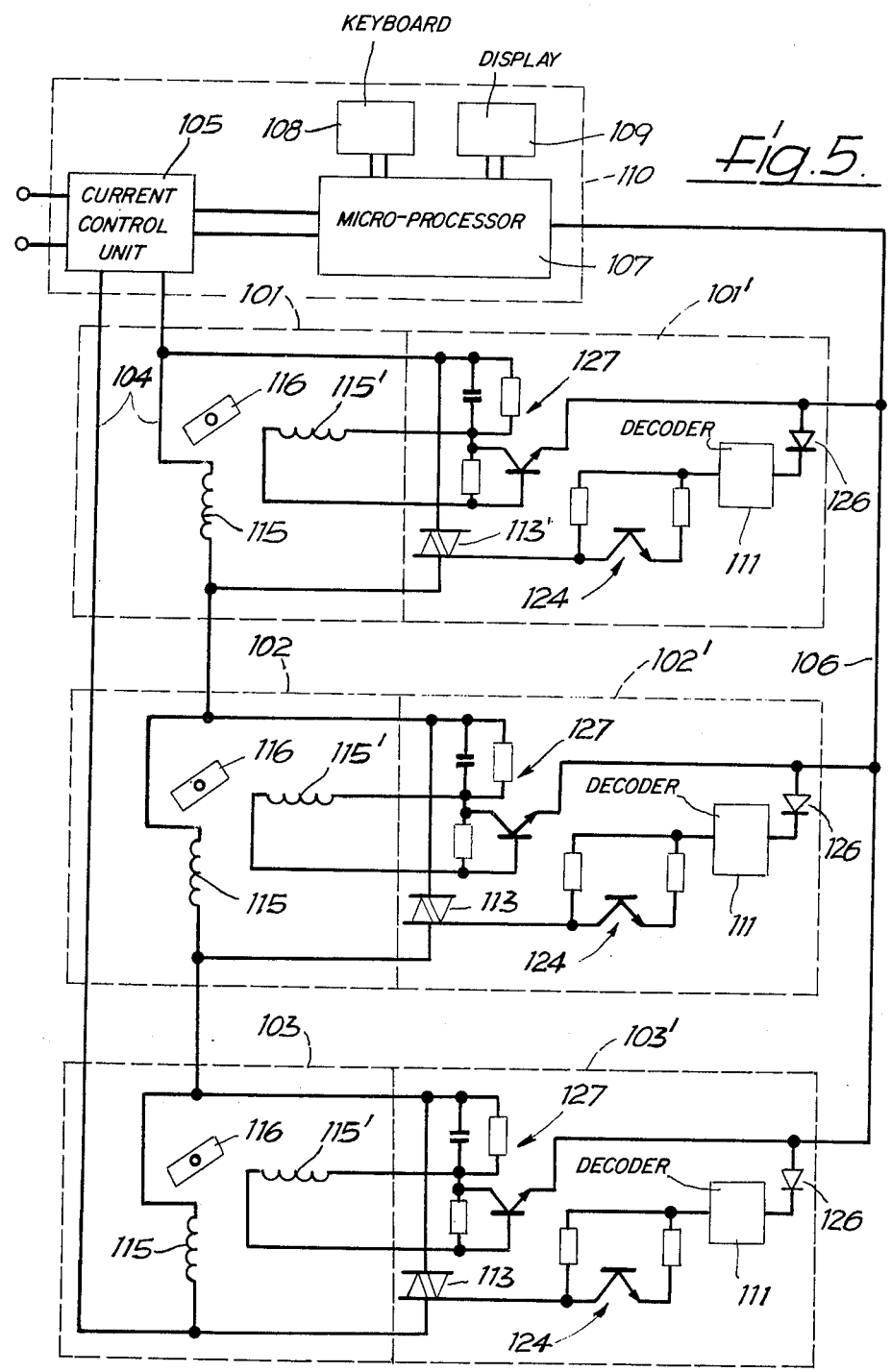
FIG. 5—a partially schematically illustrated circuit of a second exemplary embodiment.

A drive apparatus which, in the exemplary embodiment, serves to adjust the inclination of a backrest, the seat height, as well as the entire longitudinal position of the seat, has for these three adjustment possibilities, respectively, electric motors 1, 2 and 3. These three motors, which are formed in the exemplary embodiment as step motors, are, as shown in FIG. 1, connected in series and lie in a double-lead closed-circuit energy supply 4, whose beginning and end are connected to a current control unit 5, which, in turn, is connected to the current supply system of the vehicle (not shown).

Because all motors lie in series in the closed-circuit energy supply 4, the number of motors can be selected as desired. Thus, fewer as well as more motors can be arranged in the closed-circut energy supply and, for example, adjusting motors for a second seat or adjusting motors may be added for additional adjustment possibilities.

Each of the electric motors 1 through 3 has an electric control device 1', 2', or 3', respectively, which, in the exemplary embodiment, is structurally combined with the motor. All of these control devices lie in a control closed-circuit 6, which is advantageously located parallel to the closed-circuit energy supply 4, in order to arrange the wiring as simply as possible, and whose beginning and end are connected with a micro-processor 7 which controls the current control unit 5 and, together therewith a keyboard 8 and a display 9, forms a central control 10. The central control unit 10 comprises for each energy supply line a controllable bridge unit, which allows a current flow only in the direction selected by the micro-processor 7.

Each of the identical control devices 1', 2', and 3' contains, as shown in FIG. 2, a decoder 11 which can be reached by means of the control closed-circuit 6. The decoder 11 controls two triode alternating-current ac semi-conductor switches 13 and 14. These two triode ac semi-conductor switches 13 and 14 lie in line with one or the other of the leads of the closed-circuit energy supply 4 and have the purpose of either short-circuiting the associated motor, i.e., motor 1 in FIG. 1, in order to prevent a flow of current through the motor, or placing the motor in line with the two leads of the closed-circuit energy supply 4. Because the two triode ac semi-conductors 13 and 14 have a switching function, mechanically operating switches, such as two relays, could also be provided in their place.

The stator 15 of each of the electric motors 1 through 3 forms at least two pole pairs such as is schematically illustrated in FIG. 2. The winding associated with the individual poles are, as FIG. 2 also shows, connected to two groups of windings, whereby the arrangement of the individual windings to the poles is selected in such a manner that, on one pole with a winding of one group, there is a pole with a winding of the second group and then, again, there is on another pole with a winding of the first group, a pole with the winding of the second group in following succession. The first winding group lies parallel to the triode ac semi-conductor 13; the second, parallel to the triode ac semi-conductor 14. The current and the direction of the current in one group can, thus, be controlled independent of the current and current direction in the other group.

The rotor 16 of each of the electric motors 1 through 3 is formed without windings. The cylindrical rotor body 17, which consists of a magnetic material, is provided with longitudinal grooves which are radially open and preferably have a dove-tailed cross-sectional surface, as is shown in FIG. 4. Permanent magnets 18, which produce a radial magnet field such that the north pole and south pole alternate in the circumferential direction of the rotor, lie in these longitudinal grooves. The permanent magnets 18 are either placed in the milled grooves or cast into the rotor bodies 17.

The possibility of equipping the rotor body 17 selectively with weaker or stronger permanant magnets allows different field strengths and, thereby, different torques in otherwise unchanged embodiments of the motor.

As FIG. 3 shows in the exemplary embodiment, the control unit 1', arranged on a baseplate 19, is positioned in the stator housing 21 adjacent one frontal side of the stator 15 and the rotor 16. In the exemplary embodiment on the other frontal side, there is a transmission 22 which can be formed, for example, as a planetary gear.

If, for example, an adjusting movement is to be performed with the aid of electric motor 1, in the exemplary embodiment by means of the keyboard 8, a corresponding order is entered into the micro-processor 7. This order can also contain the amount and direction of the adjusting movement. If this is not the case, then the micro-processor 7 establishes the amount and direction. The micro-processor 7 supervises the rotation of the motors by counting signals which are characteristic for the steps (fractional part of one revolution) made by the motors. The counting begins at a zero position and, in the one direction, the number of signals is added; in the other direction, subtracted. Therefore, the stored number is characteristic for the instantaneous position. The micro-processor 7 calculates the number of revolutions (or steps) necessary for bringing the device driven by the motor from the instantaneous position to the new position. All motor positions correspond to number signals. If the new position has a greater number than the instantaneous position, the micro-processor 7 selects one direction and, if the new position has a lower number, it selects the other direction. The micro-processor 7, via the closed-circuit control 6, causes the two triode ac semi-conductor switches 13 and 14 of the motor 1 to be switched to the non-conducting condition, and causes the corresponding triode ac semi-conductor switches of all other motors to be switched into the conducting position. In addition, the micro-processor 7 establishes the direction of current flow of the turn-on current in the two leads of the closed-circuit energy supply 4. The micro-processor 7 switches on the motor selected by the operator (for instance, by actuating a keyboard) by sending the respective pulse train, and switches the motor off by sending a reset signal. The micro-processor 7 stores all of the motors' directions of rotation during their last motion by storing signals characteristic of the direction.

In the embodiments of FIGS. 1 and 2, the sequence of commutation signals sent by the micro-processor 7 to unit 5 is characteristic and, in the embodiment of FIG. 5, the characteristic signals are the position characterizing and commutation signals. Based on the sequence of signals for the last direction of movement and the new direction, the micro-processor 7 can determine the line and/or the direction of the turn-on current. If the motor 1, for example, should rotate clockwise in a viewing direction according to FIG. 2, then the direction of current in the two leads of the closed-circuit energy supply 4 is selected in such a manner that the polarities of the individual poles of the stator 15 shown in FIG. 2 result. The rotor 16 thereby rotates by one step which, in a two-poled embodiment of the rotor and the corresponding four-poled embodiment of the stator, corresponds to an angular rotation of 90 degrees, as can be seen in FIG. 2. In a four-poled embodiment of the rotor and a corresponding eight-poled embodiment of the stator, as shown in FIG. 4, the angular rotation of one step is 45 degrees. If a rotation of more than one step is necessary, then the micro-processor 7 alternately reverses the direction of current in one and then the other of the two leads of the closed-circuit energy supply 4, which alternately results in a demagnetization of the poles of one and then the other winding group. Each current reversal in one or the other of the leads of the closed-circuit energy supply 4 thus results in a rotation of the rotor by one step.

The micro-processor 7 counts the number of current reversals and is thereby able to determine and store the position of each portion of the seat driven by each motor. It can, therefore, also determine how many steps are necessary in order to arrive from the previously assumed position into a desired different position. The micro-processor 7 counts the signals characteristic for the steps by means of a counter. The micro-processor 7 knows how many steps correspond to one revolution. For instance, one step or pulse corresponds to a rotation of 90 degrees. Therefore, the micro-processor 7 determines the positions on the basis of the number of steps or pulses.

To the extent that the present position of the motors or of the devices driven thereby is not stored in a memory which does not lose its storage capacity if the energy supply fails, a stop can be provided at one end of the adjustment range for each device driven by the electric motors 1 through 3. Then, when the energy supply is again present after failure, each of the apparatus can be moved to this stop which can be accomplished by hand or automatically by the micro-processor. Thereafter, the apparatus can again be brought into the desired positions which the micro-processor establishes on the basis of the number of steps associated with these positions.

An exemplary embodiment in which the closed-circuit energy supply 104 with only one lead is necessary for the energy supply of the electric motors 101, 102, and 103 is shown in FIG. 5. As in the exemplary embodiment according to FIGS. 1 through 4, the central control 110 consists of a micro-processor 107, a current control unit 105 controlled thereby, a keyboard 108, and a display 109. The stator of all motors 101 through 103 is, as in a direct current machine, formed in such a manner that a north pole and a south pole follow in succession in the circumferential direction, whereby a reversal of the current direction through the stator winding 115 leads to a reversal of the polarity of each pole. In addition to the winding 115, the stator carries an auxiliary winding 115', which is arranged in such a manner that it is interlinked with the field of the rotor 116. The rotor 116 is basically formed like the rotor 16 of the first exemplary embodiment, i.e., it is activated by a permanent magnet. The number of its poles, however, is the same as that of the stator.

The auxiliary winding 115' serves to produce position characterizing and commutating signals. The auxiliary winding could, therefore, also be replaced by, for example, a Hall generator.

As in the exemplary embodiment according to FIGS. 1 through 4, each of the electric motors 101 through 103 has a control unit 101', 102' or 103' which is advantageously structurally combined with the motor, such as is shown in FIG. 3. As FIG. 5 shows, all control units are connected with the micro-processor 107 by means of a common control line 106.

Each control device 101', 102', and 103' contains a triode ac semi-conductor switch 113 which is connected in parallel to the terminal connectors of the stator, i.e., in the exemplary embodiment, it is connected in parallel to the stator winding 115 and is controlled by a decoder 111 by means of an amplifying stage 124, which decoder 111 in the exemplary embodiment is a Billig decoder in the form of an impulse counter. This decoder 111 produces a control signal for switching on a respective motor whenever a train of a predetermined number of pulses is sent along the control line by the micro-processor 7. The end of the train is marked by a signal or an interval. All counters respond to different numbers of pulses. If, for instance, the counters responds to 4, 6 and 8 pulses, respectively, and, if the micro-processor sends a train of 6 pulses, all counters count the pulses but only the 6-pulse-counter responds because there is no train-end-signal after the 4th pulse. Therefore, the 4-pulse-counter cannot respond. A reset-signal resets all counters thereby switching off all the motors. The counters are CMOS elements or TTL-elements, manufactured, for instance, by Texas Instruments, ITT, or Motorola.

The input of this decoder 111 is connected with the control line 106 by means of a diode 126. The auxiliary winding 115' is connected to the input of a second amplifying stage 127, whose output is connected with the control line 106.

Because each rotation of the rotor 116 by one angle corresponding to the pole separations leads to the production of a position characterizing and commutating signal which arrives via the control line 106 at the micro-processor 107, the control of the rotor and thereby also the position of the apparatus driven by the rotor can be stored in a coded form in the micro-processor 107. Because the auxiliary winding 115' is interlinked with the field of the rotor, the position characterizing and commutating signals are also produced during the rundown of the rotor after the energy supply to the stator is turned off.

As in the first exemplary embodiment, the micro-processor 107 selects the motor which is to be turned on in that, by means of the decoder 111 associated with this motor, it switches the triode ac semi-conductor switch 113 into the non-conducting position, while in all other motors the decoder brings the associated triode ac semi-conductor switches into the conducting conditions and holds them in this condition. The current delivered by the current supply unit 105 can, therefore, only flow through the stator winding 115 of the selected motor. The current direction of the turn-on current is established by the micro-processor 107 on the basis of the position of the rotor 116 present before being turned on. As soon as the first position characterizing and commutating signal arrives, the micro-processor 107 causes a current reversal through the current control unit 105. The rotor therefore continues to rotate in the same direction of rotation and, after a rotational angle corresponding to one pole separation, produces the next position characterizing and commutating signal with the aid of the auxiliary winding 115', which again causes a current reversal.

Because, in this exemplary embodiment, the frequency with which the current reversal takes place is not determined by the micro-processor 107, but rather by the rotor rotation, the motors 101 through 103 have a method of operation similar to a direct current motor.

The micro-processor 107 counts the position characterizing and commutating signals and can determine and store the turn-off point as well as the position of the device driven by the motor from the number of these signals, after the rotor has come to a stop.

Both exemplary embodiments thus have a simple wiring system, inexpensive and maintenance-free motors, as well as a simple electronic system. Also advantageous is that no radio interference suppression is necessary. Finally, it is common to both exemplary embodiments that different torques can be effected by using different strengths of permanent magnets in the rotor.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Drive apparatus, having a plurality of electric motors and a central control common to the plurality of motors, from which central control each motor can be turned on and off, comprising:

said plurality of motors lies in series in closed-circuit energy supply;

each of said plurality of motors has a control unit which can be turned on from the central control via a control line common to said plurality of motors by an address; and each of said plurality of control units contains a short-circuit device connected in parallel with its connecting terminals.

2. Drive apparatus according to claim 1, wherein some of the plurality of motors are step motors.

3. Drive apparatus according to claim 2, wherein:

each of the step motors has a stator with two groups of windings which lie in line with one of a first and a second lead of the closed-circuit energy supply;

said two groups of windings having at least four poles, so that successive circumferential poles in the order of a winding are associated with one of the first and second group; and a windingless rotor having a number of permanent magnet-activated poles corresponding to the number of pole pairs of the stator.

4. Drive apparatus according to claim 1, wherein:

the plurality of motors have a direct current winding in a stator and a windingless rotor which has a number of permanent magnet-activated pole pairs corresponding to the pole pairs of the stator;

the control unit contains a signal sender which produces a position characterization and commutation signal over a control line common to the plurality of motors after each rotation of the windingless rotor; and the central control which has associated therewith a current supply unit determines the direction of current flow in the closed-circuit energy supply on the basis of the position characterization and commutation signal.

5. Drive apparatus according to claim 1, wherein the central control includes a micro-processor which determines direction of current flow in the closed-circuit energy supply and also determines changes in the direction of the current flow while taking into consideration a selected direction of rotation provided for one of the plurality of motors.

6. Drive apparatus according to claim 5, wherein the micro-processor keeps stored at least a last position characterization and commutation signal of each of said plurality of motors and establishes a direction of a turn-on current on the basis of the last position characterization and commutation signal as well as on the basis of the selected direction of rotation.

7. Drive apparatus according to claim 5, wherein the micro-processor ascertains and stores a position of the drive apparatus having a plurality of motors on the basis of angular steps performed by the plurality of motors.

8. Drive apparatus according to claim 1, wherein the control unit of the plurality of motors includes a decoder which controls the short-circuit device.

9. Drive apparatus according to claim 4, wherein the signal sender is formed by a winding lying in the stator and interlinked with a magnetic field of the windingless rotor.

10. Drive apparatus according to claim 4, wherein the signal sender is a Hall generator lying in a magnetic field of the windingless rotor.

* * * * *